United States Patent
Garrett et al.

(10) Patent No.: US 11,054,097 B2
(45) Date of Patent: Jul. 6, 2021

(54) SEALED FLAT PANEL RECESSED LUMINAIRE

(71) Applicant: SIGNIFY HOLDING B.V., Eindhoven (NL)

(72) Inventors: Ethan T. Garrett, Newnan, GA (US); Andre J. Irizarry, Atlanta, GA (US); Chad A. Denham, Americus, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/544,606

(22) Filed: Aug. 19, 2019

(65) Prior Publication Data
US 2021/0054980 A1    Feb. 25, 2021

(51) Int. Cl.
| | |
|---|---|
| *F21V 23/06* | (2006.01) |
| *F21S 8/02* | (2006.01) |
| *F21S 8/04* | (2006.01) |
| *F21V 21/04* | (2006.01) |
| *F21V 21/03* | (2006.01) |
| *F21V 17/02* | (2006.01) |
| *F21V 17/10* | (2006.01) |

(52) U.S. Cl.
CPC .............. *F21S 8/043* (2013.01); *F21V 17/02* (2013.01); *F21V 17/10* (2013.01); *F21V 21/03* (2013.01); *F21V 21/041* (2013.01); *F21V 21/049* (2013.01)

(58) Field of Classification Search
CPC .......... F21S 8/043; F21V 17/02; F21V 17/10; F21V 21/03; F21V 21/041; F21V 21/049
See application file for complete search history.

(56) References Cited

U.S. PATENT DOCUMENTS

| | | | |
|---|---|---|---|
| 6,079,844 A | 6/2000 | Whitehead | |
| 6,379,012 B1 | 4/2002 | Enochs | |
| 6,652,124 B2 * | 11/2003 | Schubert | F21S 8/02 362/148 |
| 7,195,359 B1 | 3/2007 | Conti | |
| 7,390,111 B2 * | 6/2008 | Lippis | E04B 9/0478 248/228.7 |
| 7,559,677 B1 * | 7/2009 | Dupre | F21S 8/02 362/287 |
| 7,993,025 B2 | 8/2011 | Chiu | |

(Continued)

OTHER PUBLICATIONS

HALO Commercial. PR8 8" LED Fixture. Eaton Brochure. pp. 1-4.

*Primary Examiner* — Arman B Fallahkhair (57) ABSTRACT

A sealed luminaire includes a light engine that has a housing assembly that defines a light emitting opening and a lightguide that is disposed in the housing assembly. The lightguide is configured to receive light from a light source through an edge thereof and emit the light through a major surface thereof and the light emitting opening. Further, the sealed luminaire includes a sealing assembly. The sealing assembly includes a protective lens that is coupled to the housing assembly of the sealed luminaire such that the protective lens covers the light emitting opening, and a gasket that is coupled to the protective lens. A mounting bracket is configured to mount the sealed luminaire in a mounting structure such that the sealed luminaire is clamped between the mounting bracket and the mounting structure and the gasket creates a seal between the sealed luminaire and the mounting structure.

20 Claims, 10 Drawing Sheets

(56) References Cited

U.S. PATENT DOCUMENTS

| | | |
|---|---|---|
| 8,947,349 B1 | 2/2015 | Hart |
| 9,028,127 B2 * | 5/2015 | Kim .................... G02B 6/0026 362/616 |
| 9,091,426 B2 | 7/2015 | Bell |
| 9,379,012 B2 | 6/2016 | Alptekin |
| 2002/0149943 A1 | 10/2002 | Obata |
| 2005/0270766 A1 | 12/2005 | Kung |
| 2010/0289664 A1 | 11/2010 | Mizushima |
| 2014/0043516 A1 | 2/2014 | Baker |
| 2014/0301091 A1 * | 10/2014 | Rensmo ................ F21V 21/26 362/404 |
| 2015/0277018 A1 * | 10/2015 | Sahlhoff ................ G02B 6/005 362/607 |
| 2016/0298820 A1 | 10/2016 | Deely et al. |
| 2017/0184263 A1 * | 6/2017 | Hierzer .................. F21V 15/01 |

\* cited by examiner

SEALED FLAT PANEL RECESSED LUMINAIRE

TECHNICAL FIELD

Embodiments of the present disclosure relate generally to luminaires, and more particularly to a sealed low-profile flat panel luminaire.

BACKGROUND

Thin flat panel recessed luminaires are typically installed in ceiling surfaces that have a shallow plenum space. However, existing thin flat panel recessed luminaires are not configured for use in certain spaces such as food processing spaces, cleanroom and containment spaces, behavioral health institutes, etc., that require specific ratings that are mandated by various regulatory bodies (e.g., UL, NEMA, IP, etc.). This background information is provided to reveal information believed to be of possible relevance to the present disclosure. No admission is necessarily intended, nor should be construed, that any of the preceding information constitutes prior art against the present disclosure.

SUMMARY

In one aspect, the present disclosure relates to a luminaire that includes a lighting assembly. The lighting assembly includes a housing assembly that defines an internal cavity and a light emitting opening. Further, the lighting assembly includes a lightguide that is disposed in the internal cavity such that the lightguide receives light from a light source in the internal cavity through an edge of the lightguide and emits the light through a major surface thereof and through the light emitting opening. Furthermore, the lighting assembly includes a sealing assembly that is coupled to the housing assembly such that the sealing assembly covers the light emitting opening. The luminaire further includes a mounting bracket that is configured to mount the lighting assembly comprising the sealing assembly to a mounting structure that is disposed in a mounting surface such that the lighting assembly of the luminaire is securely retained between the mounting structure and the mounting bracket and a seal is created between the lighting assembly and the mounting structure. The mounting bracket is adjustable to mount the lighting assembly comprising the sealing assembly, the sealing assembly having a thickness that is greater than or equal to a first thickness and less than or equal to a second thickness, the second thickness being greater than the first thickness.

In another aspect, the present disclosure relates to a lighting system that includes a sealed luminaire. The sealed luminaire includes a light engine that comprises a lightguide and a light source that operate in concert to emit light through a light emitting opening of the light engine. Further, the sealed luminaire includes a sealing assembly. The sealing assembly includes a protective lens coupled to the light engine and covering the light emitting opening, and a gasket coupled to the protective lens and disposed adjacent a perimeter thereof to create a seal between the sealed luminaire and a mounting structure when the sealed luminaire is mounted in the mounting structure. Furthermore, the lighting system includes a mounting bracket that is configured to securely retain the sealed luminaire between the mounting structure and the mounting bracket. The mounting bracket is adjustable to mount the sealed luminaire comprising the protective lens, the protective lens having a thickness that is greater than or equal to a first thickness and less than or equal to a second thickness, the second thickness being greater than the first thickness.

These and other aspects, features, and embodiments of the disclosure will become apparent to a person of ordinary skill in the art upon consideration of the following brief description of the figures and detailed description of example embodiments.

BRIEF DESCRIPTION OF THE FIGURES

The foregoing and other features and aspects of the present disclosure are best understood with reference to the following description of certain example embodiments, when read in conjunction with the accompanying drawings, wherein.

The drawings illustrate only example embodiments of the present disclosure and are therefore not to be considered limiting of its scope, as the present disclosure may admit to other equally effective embodiments. The elements and features shown in the drawings are not necessarily to scale, emphasis is instead placed on clearly illustrating the principles of the example embodiments. Additionally, certain dimensions or positions may be exaggerated to help visually convey such principles.

DETAILED DESCRIPTION OF EXAMPLE EMBODIMENTS

In the following paragraphs, a sealed thin flat panel recessed luminaire (hereinafter 'sealed luminaire') will be described in further detail by way of examples with reference to the attached drawings. In the description, well-known components, methods, and/or processing techniques are omitted or are briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s). The term 'thin' as used herein with respect to the luminaire may generally refer to a luminaire that has a height (height of luminaire and/or height of luminaire with or without the electronic components such as drivers mounted thereto) that is less than the width and the length of the luminaire.

The sealed luminaire of the present disclosure includes a light engine and a sealing assembly that is attached to the light engine such that sealing assembly provides impact resistance and ingress protection to the light engine. The sealing assembly covers a portion of the light engine that faces an area that is to be illuminated to protect the light engine from environmental elements such as dust, moisture, etc., in the area that is to be illuminated. Further, when the sealing luminaire is mounted in a mounting structure (e.g., drywall frame, T-grid, etc.) that is disposed in a mounting surface (e.g., ceiling surface), the sealing assembly is configured to engage a mounting structure such that the sealing assembly creates a seal between the sealed luminaire and the mounting structure to prevent environmental elements in the area that is to be illuminated from entering the plenum space behind the mounting surface and vice-versa. The sealing assembly is configured to meet the requirements for various certifications and ratings such as, but not limited to, IP66 rating, NSF rating, ISO cleanroom rating, FED-STD-209E cleanroom rating, and New York Office of Mental Health certification.

Further, the sealed luminaire includes a mounting bracket that is coupled to the light engine. The mounting bracket is configured to securely retain the sealed luminaire against the mounting structure such that the sealed luminaire is clamped between the mounting bracket and the mounting structure and the sealing assembly engages the mounting structure. The clamping of the sealed luminaire between the mounting bracket and the mounting structure prevents the formation of any gap between the sealed luminaire and the mounting structure.

The mounting bracket is configured to be adjusted to mount sealed luminaires having sealing assemblies of different thicknesses. That is, the same mounting bracket can be used to mount a sealed luminaire comprising a sealing assembly of a first thickness, a sealed luminaire comprising a sealing assembly of a second thickness, and/or a sealed luminaire comprising a sealing assembly that has a thickness that is between the first thickness and the second thickness. The first thickness is different from and less than the second thickness.

An example sealed luminaire will now be described in greater detail in association with FIGS. 1-10. Referring to FIGS. 1-10, the sealed luminaire 100 may include a light engine 102 and a sealing assembly 104 that is coupled to the light engine 102. The light engine 102 may include a housing assembly 502 that defines an internal cavity 504. Further, the light engine 102 may include a light assembly 506 (shown in FIG. 5) that is configured to be housed within the internal cavity 504 defined by the housing assembly 502.

The housing assembly 502 may include a front frame 510 and a back plate 512 that is coupled to the front frame 510 using fasteners 526. The front frame 510 may include a side wall 550 and a support wall 551 that extends substantially perpendicular to the side wall 550 from an edge of the side wall 550 such that they define a substantially L-shaped cross-sectional profile. Further, the front frame 510 may include a divider flange 552 that is disposed on the support wall 551 and is offset from an outer edge of the support wall 551 and the side wall 550. The divider flange 552 may extend substantially perpendicular to the support wall 551.

Figure 1:
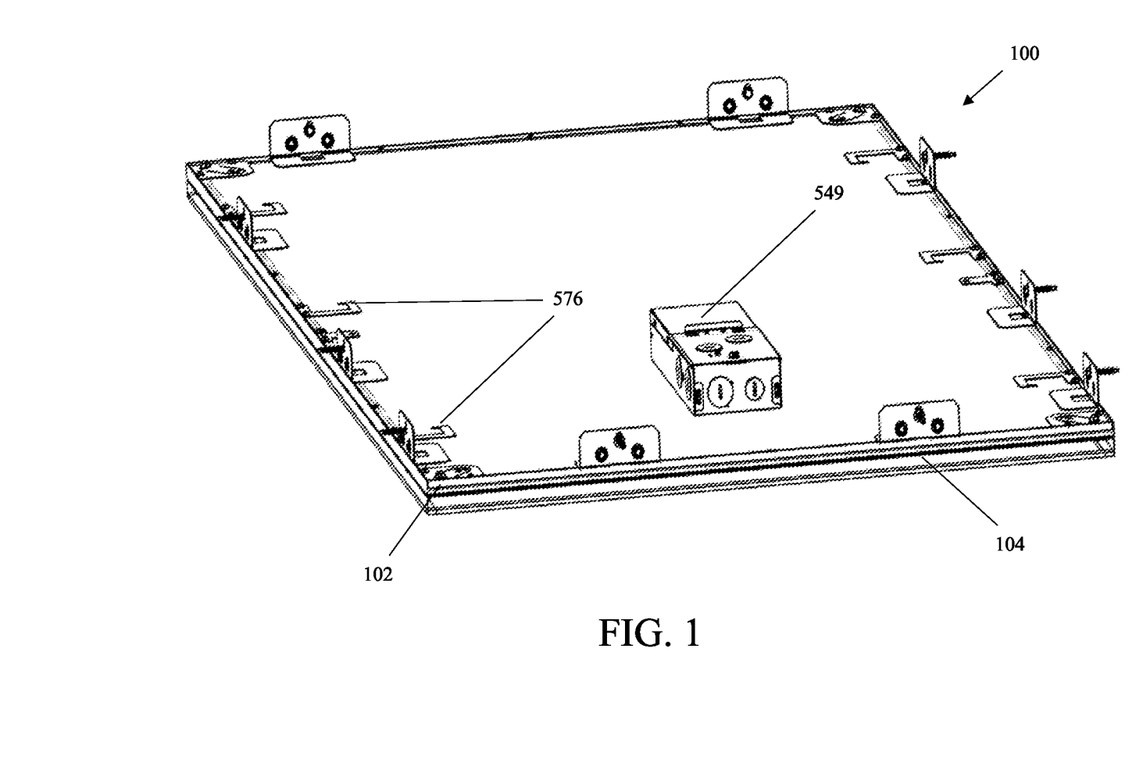
FIG. 1 illustrates a top perspective view of an example sealed thin flat panel recessed luminaire, in accordance with example embodiments of the present disclosure.
Figure 2:
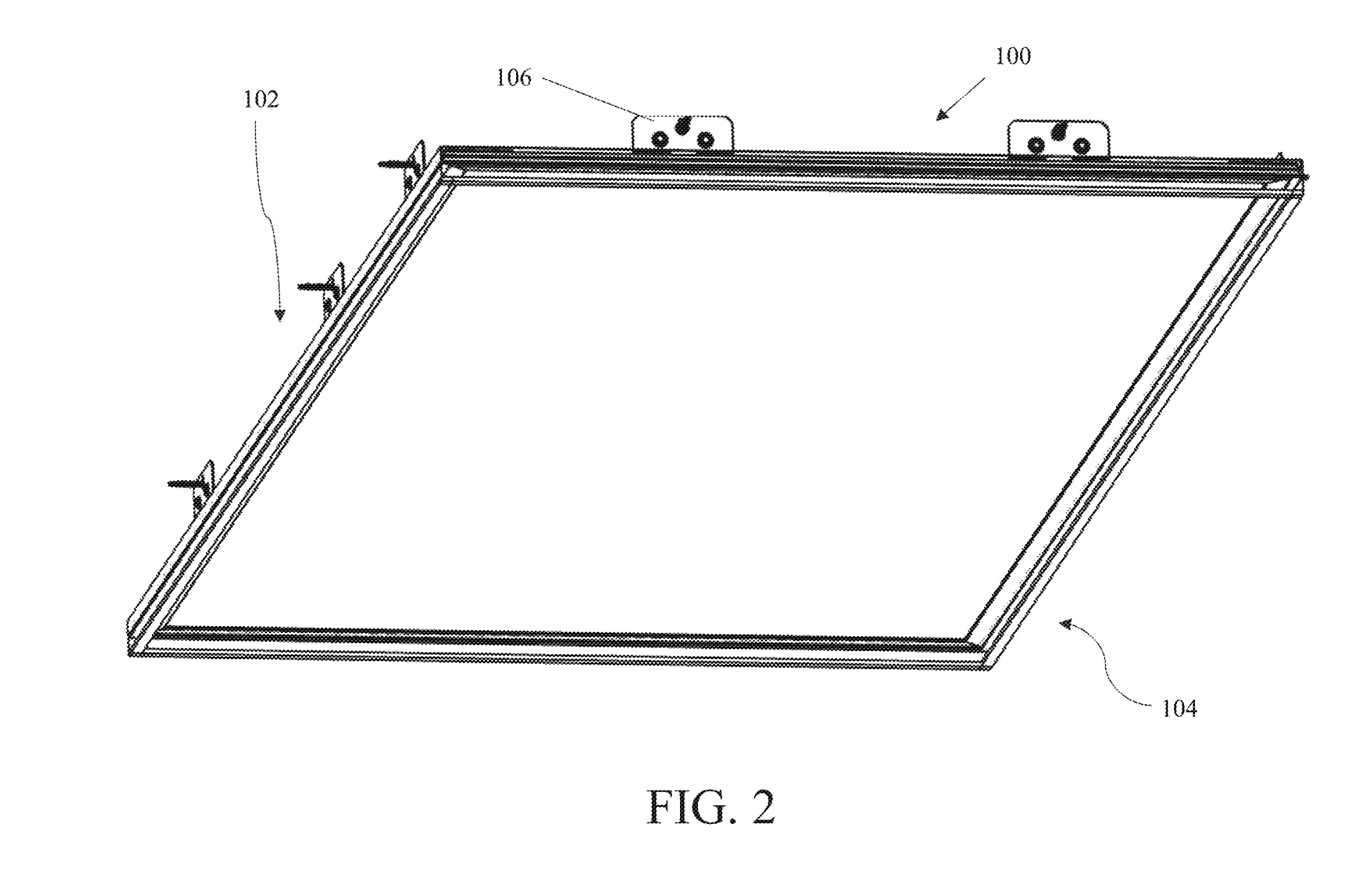
FIG. 2 illustrates a bottom perspective view of the example sealed thin flat panel recessed luminaire, in accordance with example embodiments of the present disclosure.
Figure 3:
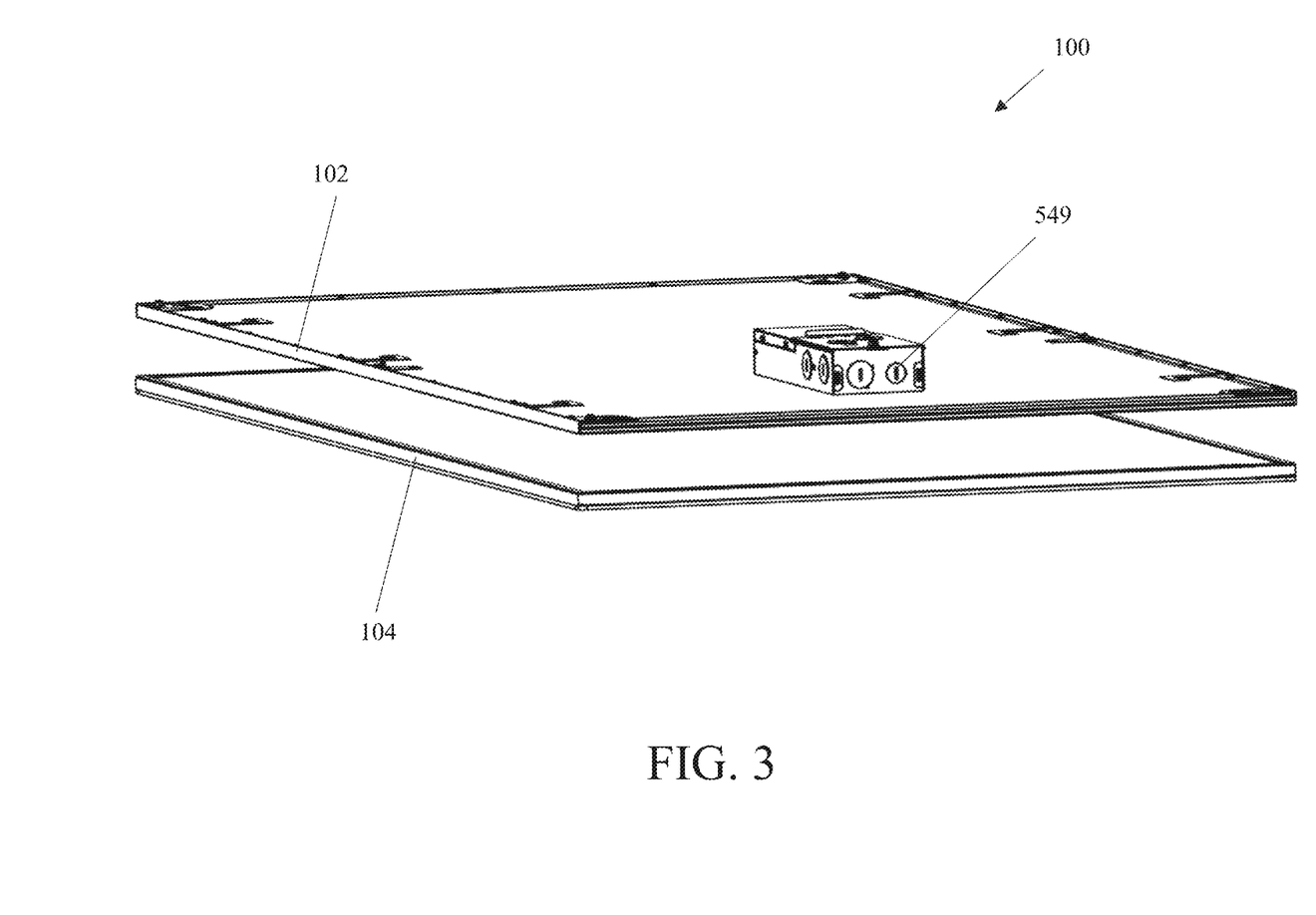
FIG. 3 illustrates an exploded view of the example sealed thin flat panel recessed luminaire, in accordance with example embodiments of the present disclosure.

The back plate 512 may be configured to mount one or more electronic devices, such as drivers 549, ballasts, emergency battery packs, etc., thereto as illustrated in FIGS. 1 and 3. In some example embodiments, the sealed luminaire 100 may be certified by code for recessed installation, and the back plate 512 of the sealed luminaire 100 may include grid clips 576 that are disposed thereon to securely retain the sealed luminaire 100 within a mounting surface (e.g., ceiling). That is, the grid clips 576 securely retain the sealed luminaire 100 within a mounting structure, such as a T-grid frame 995 or drywall frame 895 that is configured to recess mount the sealed luminaire 100 in the mounting surface. The grid clips 576 are configured to be hooked onto the members 975 of the T-grid frame 995 or the walls 875 of the drywall frame 895 to prevent the sealed luminaire 100 from falling through an installation aperture of the mounting structure (995, 895) in the event of an earthquake or for fire fighter safety.

Figure 5:
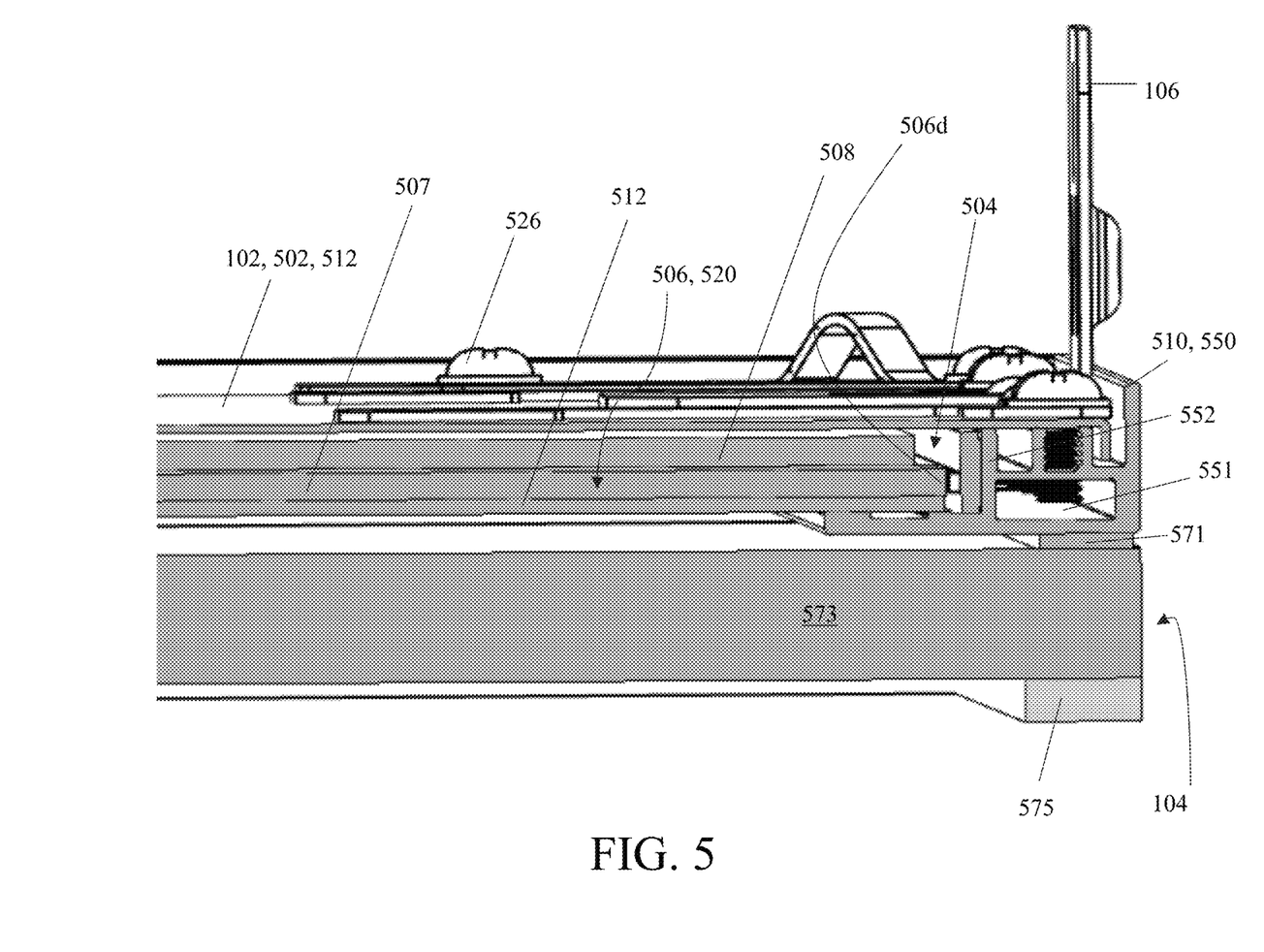
FIG. 5 illustrates an enlarged cross-section view of a portion of the example sealed thin flat panel recessed luminaire, in accordance with example embodiments of the present disclosure.
Figure 6:
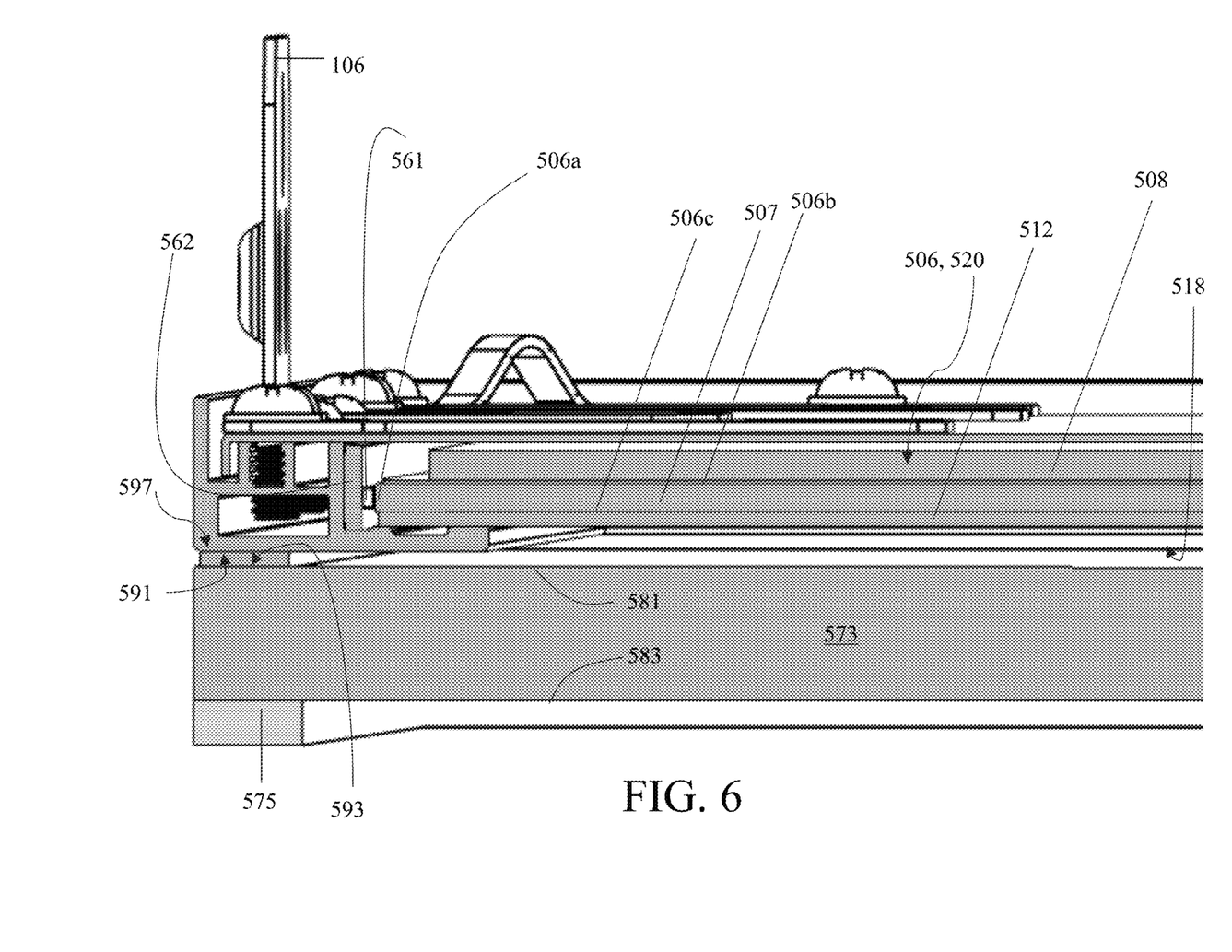
FIG. 6 illustrates an enlarged cross-section view of another portion of the example sealed thin flat panel recessed luminaire, in accordance with example embodiments of the present disclosure.

The light assembly 506 that is configured to be disposed in the internal cavity 504 of the housing assembly 502 may include a light transmission unit 520. The light transmission unit 520 may include a lightguide panel 507, a diffuser lens 512, and a reflector 508 that are stacked together such that the lightguide panel 506 is disposed between the reflector 508 and the diffuser lens 512 as illustrated in FIGS. 5 and 6. Further, in some example embodiments, a foam panel (not shown in the figures) may be disposed between the reflector 508 and the back plate 512 to minimize stray movement of the light transmission unit 520 within the housing assembly 502.

The lightguide panel 506 of the light transmission unit 520 may include a first major surface 506b and a second major surface 506c that is opposite to the first major surface 506b. Further, the lightguide panel 507 may include and may be bound by edges (e.g., only two edges 506a, 506d are shown in FIGS. 5 and 6) that are disposed between the two major surfaces (506b, 506c). In one example embodiment, the major surfaces (506b, 506c) of the lightguide panel 506 may be patterned with microlenses that promote controlled release of light internally incident on those major surfaces (506b, 506c). The resulting light can provide beneficial illumination for an area that may be occupied by one or more people, for example. In other example embodiments, only one of the major surfaces (506b or 506c) may be patterned with microlenses. The microlenses can comprise conical features, truncated cones, convex shapes, or other appropriate features, for example.

As illustrated in FIGS. 5 and 6, the light transmission unit 520 may be supported by the support walls 551 of the front frame 510 adjacent the perimeter thereof such that the light transmission unit 520: (i) is disposed in the internal cavity 504 defined by the housing assembly 502, and (ii) covers the light emitting opening 518, and (iii) side wall 550 of the front frame 510 forms a complete border around the light transmission unit 520. Further, the light assembly 506 may include light sources 561 that are disposed on a circuit board 562 which is attached to a surface of the divider flanges 552 that faces away from the side walls 550 of the front frame 510. The light sources 561 may be disposed in front frame 510 such that: (i) the light sources 561 are adjacent to and face one or more edges (e.g., edges 506a, 506d) of the lightguide panel 507, and (ii) the light emitted by the light sources 561 enters the lightguide panel 507 through the one or more edges (e.g., edges 506a, 506d) of the lightguide panel 507.

The light from a light source 561 that enters the lightguide panel 507 through one edge thereof may be guided towards an opposite edge by the major surfaces (506b, 506c) of the lightguide panel 507. The major surfaces (506b, 506c) may be configured to provide a controlled release of light flowing through the lightguide panel 507, to illuminate an area. Light may propagate in the lightguide panel 507 via internal reflection from the two major surfaces (506b, 506c), traveling from a light-source facing edge (e.g., 506a) towards an opposing edge (e.g., 506d) such that illumination light can escape from the lightguide panel 507 through the major surfaces (506b, 506c) and/or the opposing edge. In some example embodiments, the edges of the lightguide panel 507 other than the edge through which light enters the lightguide panel 507 may not be patterned or configured for releasing light therefrom.

A portion of the light that exits the lightguide panel 507 through the second major surface 506c may pass through the diffuser lens 512 and exit to an area to be illuminated through the light emitting aperture 518 defined by the front frame 510 and the sealing assembly 104. Further, another portion of the light that exits the lightguide panel 506 through the first major surface 506b may be reflected back towards the lightguide panel 506 by the reflector 508. The portion of the light that is reflected back towards the lightguide panel 506 by the reflector 508 may pass through the lightguide panel 506 and exit via the second major surface 506c of the lightguide panel 506 towards the area to be illuminated via the light emitting aperture 518 and the sealing assembly 104.

It is noted that the light engine 102, the housing assembly 502, and the light transmission unit 520 that is described above and illustrated in FIGS. 1-10 is an example housing assembly 502 and is non-limiting. That is, in other example embodiments, the sealed luminaire 100 may include any other appropriate light engine, housing assembly, and/or light transmission unit with any other design, shape, and/or configuration that supports an edge-lit lightguide based lighting and a shallow plenum installation without departing from the broader scope of the present disclosure.

Figure 10:
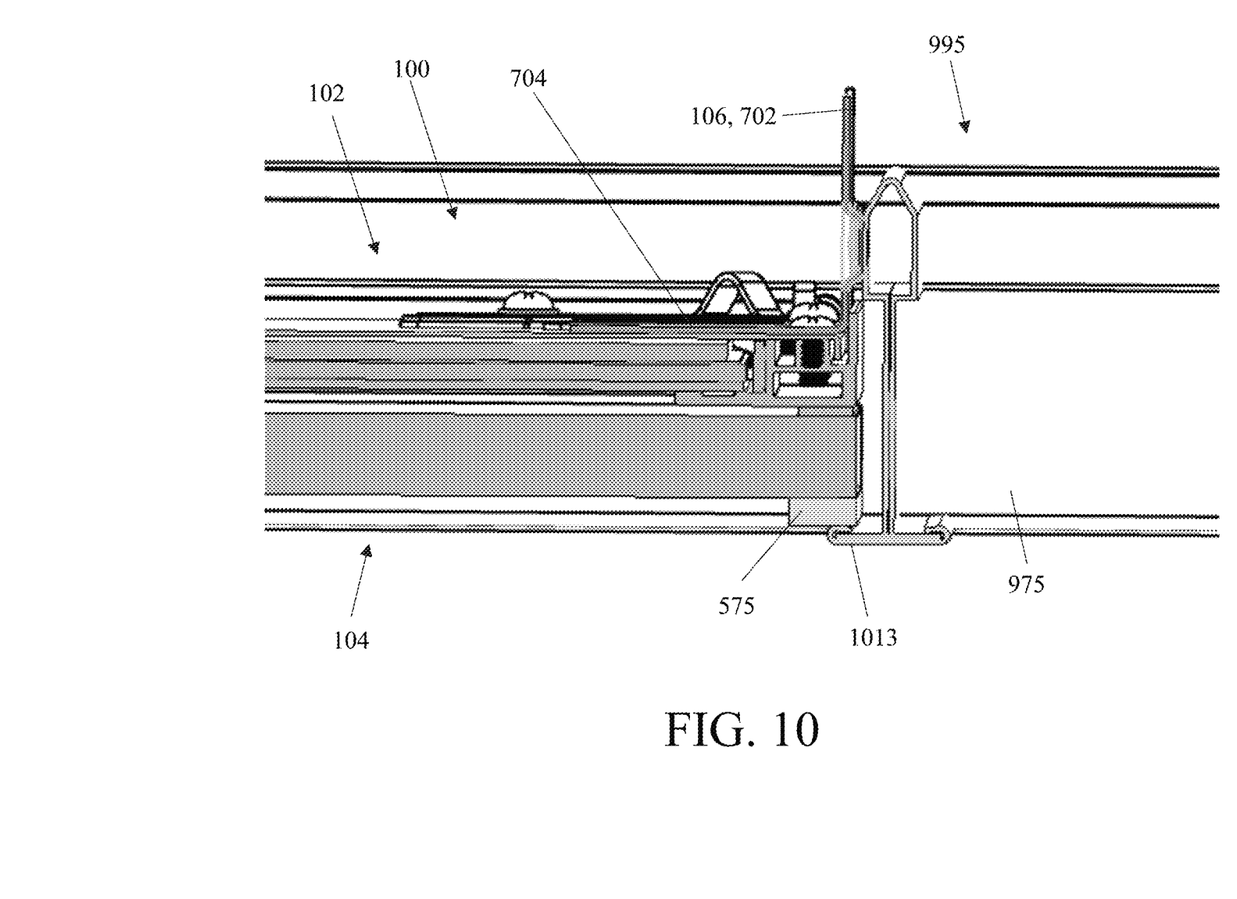
FIG. 10 illustrates a cross-section view of the example sealed thin flat panel recessed luminaire mounted in the T-grid using the mounting bracket of FIG. 7, in accordance with example embodiments of the present disclosure.

As illustrated in FIGS. 5, 6, and 10, the sealing assembly 104 may include a lens adhesion member 571, a protective lens 573 that is coupled to the light engine 102 using the lens adhesion member 571, and a gasket 575 that is coupled to the protective lens 573 such that the gasket 575 is disposed around a perimeter of a bottom surface of the protective lens 573.

In one example, the lens adhesion member 571 may include a double sided adhesive tape. However, in other example embodiments, the lens adhesion member 571 may include any other device that can couple or retain the protective lens 573 against the light engine 102. In the example embodiment illustrated in FIGS. 1-10, the lens adhesion member 571 may include a first adhesive surface 591 and a second adhesive surface 593. The lens adhesion member 571 may be disposed along a surface 597 (outer surface) of the support wall 551 that faces an area that is to be illuminated when the sealed luminaire 100 is installed in the area. The lens adhesion member 571 may be coupled to the light engine 102 such that the first adhesive surface 591 of the lens adhesion member 571 engages the surface 597 of the front frame 510 of the light engine 102.

The protective lens 573 may be coupled to light engine 102 such that: (a) a portion of a first surface 581 of the protective lens 573 that is adjacent the perimeter thereof engages the second adhesive surface 593 of the lens adhesion member 571, and (b) the protective lens 573 covers the surface 597 (outer surface) of the support wall 551 that faces an area that is to be illuminated and the second major surface 506c of the lightguide panel 506 and the diffuser lens 512. In other words, the protective lens 573 may be coupled to the light engine 102 such that the protective lens 573 is spaced apart from and disposed over a portion of the light transmission unit 520 that faces the area to be illuminated when the sealed luminaire 100 is installed in a mounting surface in the area. The distance from the light transmission unit 520 (i.e., the diffuser lens 512 and/or the second major surface 506c of the lightguide panel 506) to the protective lens 573 (i.e., a first surface 581 thereof) may be minimal such that: (a) the protective lens 573 appears to be in near-contact with the light transmission unit 520 of the light engine 102, and (b) the height of the sealed luminaire 100 is less than the width and length of the sealed luminaire 100. In other words, the sealing assembly 104 is disposed in near contact with the light engine 102 such that the resulting sealed luminaire 100 still meets the requirement for shallow plenum installations.

In one example, the protective lens 573 may be a clear acrylic or polycarbonate lens. However, in other examples, the protective lens 573 may be formed of any other appropriate material. Further, the lens that may or may not be clear and may or may not have patterns formed therein.

Figure 4:
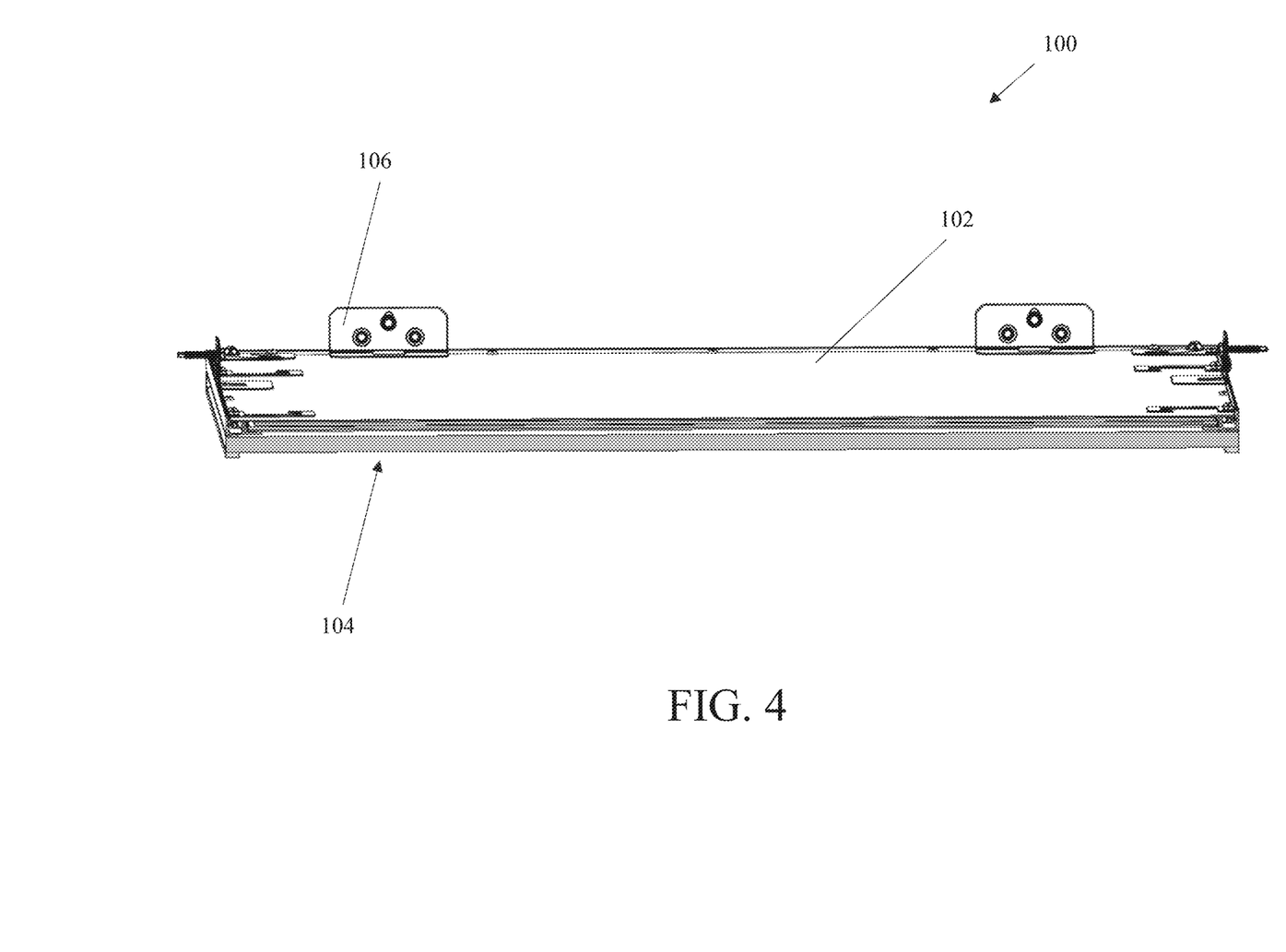
FIG. 4 illustrates a cross-section view of the example sealed thin flat panel recessed luminaire, in accordance with example embodiments of the present disclosure.

The gasket 575 of the sealing assembly 104 may be coupled to the second surface 583 of the protective lens 573. The second surface 583 of the protective lens 573 may be opposite to the first surface 581 thereof. The gasket 575 may be coupled to the protective lens 573 using an adhesive or any other appropriate coupling mechanism. As such, in some example embodiments, one side of the gasket 575 may have an adhesive coating that is configured to couple the gasket 575 to the protective lens 573 when the surface of the gasket 575 that has the adhesive coating engages the second surface 583 of the protective lens 573. As illustrated in FIGS. 4-6, the gasket 575 may be coupled to the protective lens 573 and shaped such that the gasket 575 is disposed along and adjacent a perimeter of the second surface 583 of the protective lens 573. Further, the gasket 575 may be flexible gasket such as a rubber gasket. However, in other example embodiments, the gasket 575 may be formed using any other appropriate material without departing from a broader scope of the present disclosure.

As illustrated in FIG. 10, when the sealed luminaire 100 is disposed in a mounting structure such as a T-grid frame 995 (or drywall frame 895), the gasket 575 is configured to a create a seal between the sealed luminaire 100 and a support shoulder 1013 (shown in FIG. 10) of the mounting structure 995 (or 895) on which the sealed luminaire 100 rests. The seal prevents flow or transportation of environmental elements from one side (e.g., plenum space) of the mounting surface (e.g., ceiling surface) in which the sealed luminaire is disposed to an opposite side (area to be illuminated) of the mounting surface or vice-versa.

In particular, the weight of the sealed luminaire 100 may apply pressure on the gasket 575 against the support shoulder 1013 of the mounting structure 995 to create the seal therebetween. However, the weight of the sealed luminaire 100 may not be sufficient to maintain the seal when an upward pressure (opposite to gravity) is applied to the sealed luminaire (e.g., during wash down of a kitchen using pressure washing). Accordingly, to maintain the seal at all times, the sealed luminaire 100 may include a mounting bracket 106 that is configured to clamp the sealed luminaire 100 between the mounting bracket 106 and the mounting structure 995 (or 895).

Figure 7:
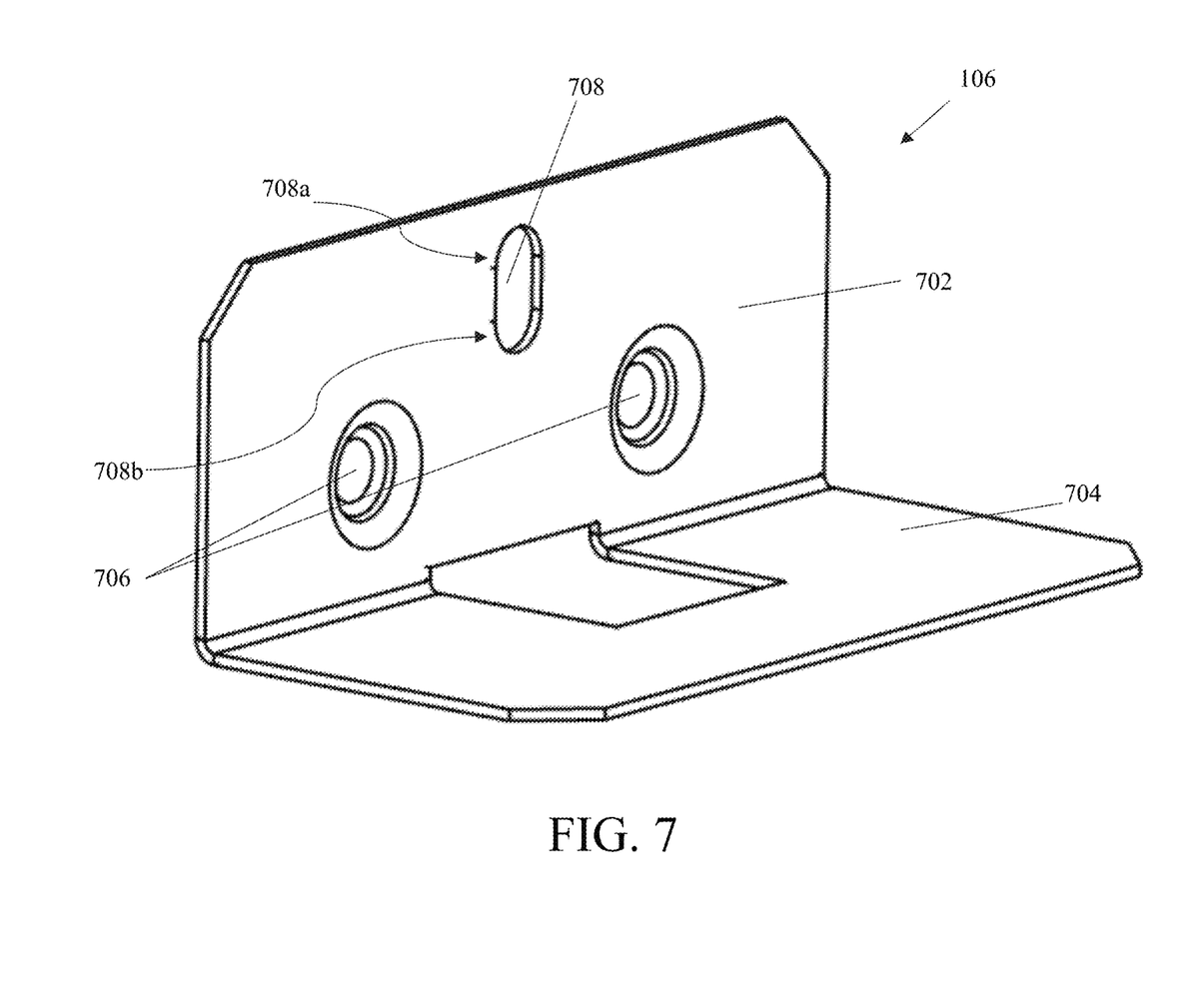
FIG. 7 illustrates a mounting bracket of the example sealed thin flat panel recessed luminaire, in accordance with example embodiments of the present disclosure.
Figure 8:
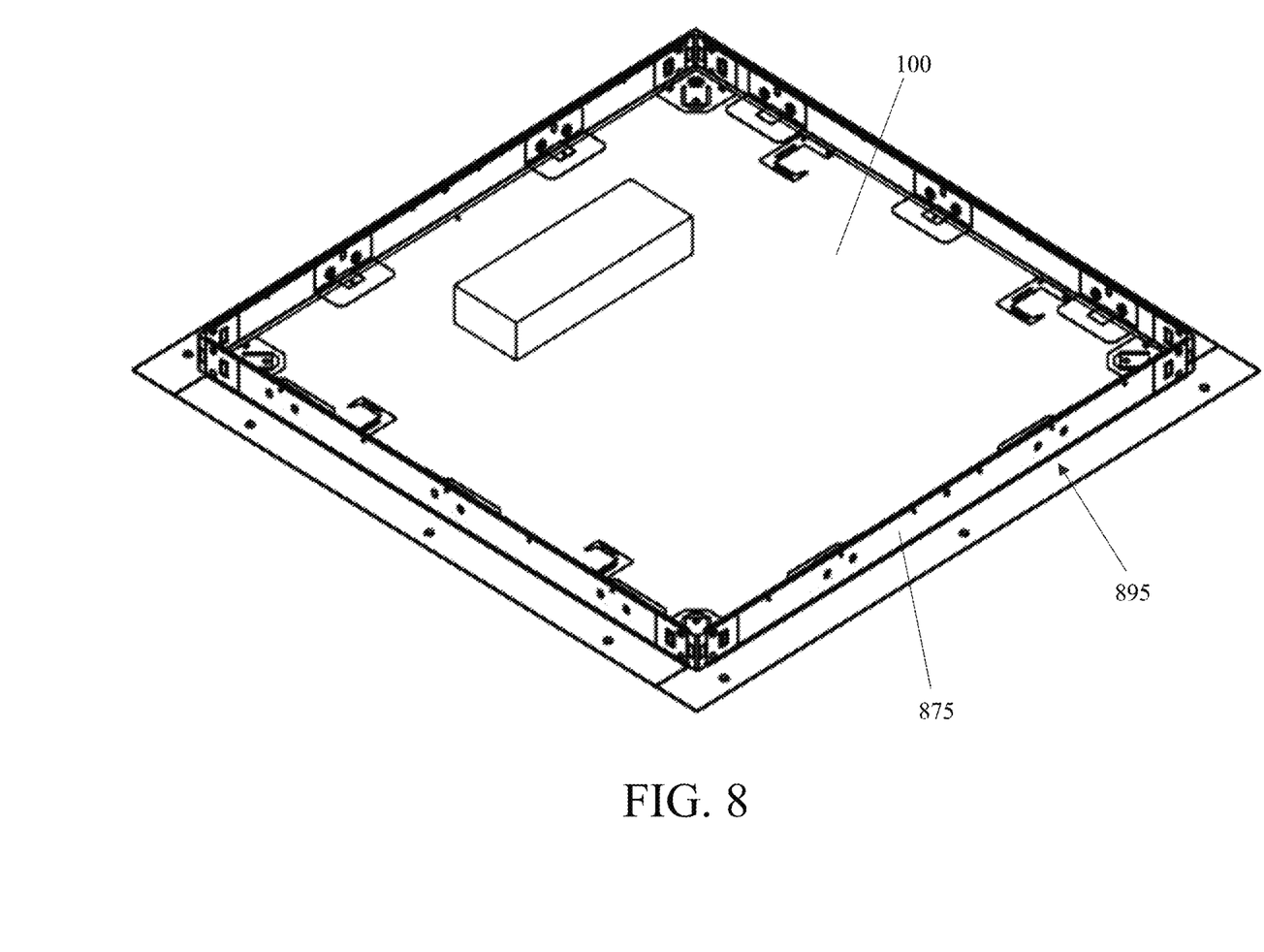
FIG. 8 illustrates a top perspective view of the example sealed thin flat panel recessed luminaire disposed in a drywall frame, in accordance with example embodiments of the present disclosure.
Figure 9:
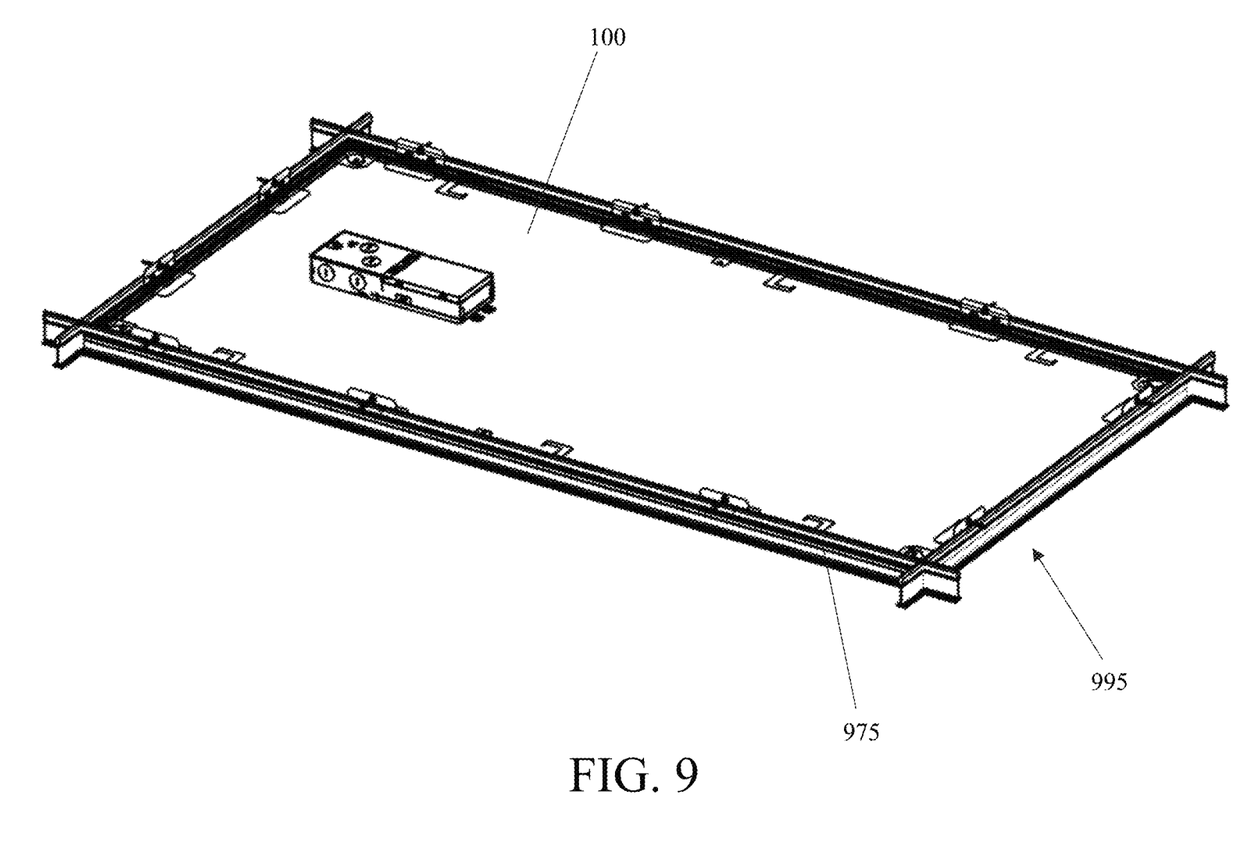
FIG. 9 illustrates a top perspective view of the example sealed thin flat panel recessed luminaire disposed in a T-grid, in accordance with example embodiments of the present disclosure.

As illustrated in FIG. 7, the mounting bracket 106 may comprise a first wall 702 and a second wall 704 that are arranged substantially perpendicular to each other such that they define an L-shaped structure. The first wall 702 may include mounting apertures 706 that is configured to receive fasteners therethrough to couple the mounting bracket 106 to the mounting structure (895, 995). Additionally, the first wall 702 of the mounting bracket 106 may include an adjustment aperture 708 that allows the mounting bracket 106 to be adjusted to accommodate sealed luminaires 100 having protective lenses 573 of different thicknesses. That is, the adjustment aperture 708 allows a single mounting bracket 106 to be used to mount sealed luminaires 100 that comprise protective lenses 573 having a thickness that is greater than or equal to a first thickness and less than or equal to a second thickness. Since the protective lens 573 contributes to the overall thickness of the sealing assembly 104, one of skill in the art can infer that the mounting bracket 106 can mount sealed luminaires 100 having sealing assemblies 104 of different thicknesses.

In one example, the adjustment aperture 708 may be an obround aperture that has a first end 708a and a second end 708b. The first end 708a of the adjustment aperture 708 may receive a fastener therethrough to mount the sealed luminaire 100 to the mounting structure (895, 995) when the sealed luminaire 100 comprises a protective lens 573 having a first thickness. Similarly, the second end 708b of the adjustment aperture 708 may receive a fastener therethrough to mount the sealed luminaire 100 to the mounting structure (895, 995) when the sealed luminaire 100 comprises a protective lens 573 having a second thickness, where the second thickness is greater than the first thickness. The thickness of the protective lens 573 may be measured as the distance from the first surface 581 of the protective lens 573 to the second surface 583 thereof. The adjustment aperture 708 may be configured to receive a fastener therethrough and between the first end 708a and the second end 708b thereof to mount the sealed luminaire 100 to the mounting structure (895, 995) when the sealed luminaire 100 comprises a protective lens 573 having a thickness that is between the first thickness and the second thickness.

In one example embodiment, the first thickness may be 0.03 inch and the second thickness may be 1.5 inch. That is, sealed luminaires having a protective lens that has a thickness ranging from 0.03 inch to 1.5 inch may be mounted to a mounting structure 995 (or 895) using the same mounting bracket 106. Accordingly, the sealed luminaire of the present disclosure does not require different mounting brackets for mounting sealed luminaires of different thicknesses (e.g., thickness of the protective lens), thereby reducing the number of product stock keeping units (SKUs). In some example embodiments, the mounting bracket 106 may be configured to mount a sealed luminaire that does not have a protective lens. That is, the first end 708a of the adjustment aperture 708 of the mounting bracket 106 may receive a fastener therethrough to mount the sealed luminaire 100 to the mounting structure (895, 995) when the sealed luminaire 100 does not include a protective lens 573, and the second end 708b of the adjustment aperture 708 may receive a fastener therethrough to mount the sealed luminaire 100 to the mounting structure (895, 995) when the sealed luminaire 100 comprises a protective lens 573 (e.g., protective lens 573 having a second thickness).

In particular, the mounting bracket 106 may be configured to mount a sealed luminaire 100 to a mounting structure 995 (or 895) such that the sealed luminaire is clamped between the second wall 704 of the mounting bracket 106 and a support shoulder 1013 of the mounting structure 995. As illustrated in FIG. 10, the second wall 704 of the mounting bracket 106 may engage the back plate 512 of the light engine 102 and the gasket 575 of the sealing assembly 104 engages the support shoulder 1013 of the mounting structure 995. The clamping of the sealed luminaire 100 between the mounting bracket 106 and the mounting structure 995 (or 895) prevents upward movement of the sealed luminaire and resulting breaking of the seal between sealed luminaire 100 and the mounting bracket 995 (or 895) upon application of an upward force that is against the weight of the sealed luminaire 100. The clamping by the mounting bracket 106 and the seal created by the gasket 575 makes the sealed luminaire 100 suitable for use in various spaces such as in cleanroom and containment spaces, food processing spaces, correctional facilities, etc. Further, the mounting bracket 106 and the sealing assembly 104 allow the sealed luminaire 100 to meet the requirements for various certifications such as, but not limited to, IP66 rating, NSF rating, ISO cleanroom rating, FED-STD-209E cleanroom rating, and New York Office of Mental Health certifications.

Even though the present disclosure describes the sealing assembly 104 having a specific shape and configuration, one of skill in the art can understand and appreciate that in other example embodiments, the sealing assembly may have any other shape that preferably substantially matches the shape of the light engine 102. In some example embodiments, the sealing assembly 104 may be configured as a wrap-around assembly where the sealing assembly covers even the sides of the light engine 102. Further, even though the present disclosure describes the different components of the sealing assembly 104 as being attached to each other and to the front frame 510 of the light engine 102 using adhesives, one of skill in the art can understand and appreciate that in other example embodiments, the components of the sealing assembly (e.g., the lens adhesion member 571, the protective lens 573, and the gasket 575) may be coupled to each other and the light engine 102 at any other portion of the light engine using any other appropriate coupling mechanisms without departing from a broader scope of the present disclosure. Furthermore, it is noted that in some example embodiments, the sealing assembly may be a single integral unit, while in other example embodiments, the sealing assembly may be configured as multiple parts that are to be put together to form the sealing assembly.

Even though the present disclosure describes a substantially L-shaped mounting bracket 106, one of skill in the art can understand and appreciate that in other example embodiments, the mounting bracket can have any other appropriate shape provided the mounting bracket provides the adjustability to mount sealed luminaires having sealing assemblies of different thicknesses without departing from a broader scope of the present disclosure. Further, even though the present disclosure describes the adjustment aperture 708 of the mounting bracket 106 as being an obround aperture, one of skill in the art can understand and appreciate that the mounting bracket can have any other appropriate feature that allows the mounting bracket to be adjusted to mount sealed luminaires having sealing assemblies of different thicknesses without departing from a broader scope of the present disclosure. For example, the adjustment aperture may include two or more apertures that are vertically aligned, a slot, etc., without departing from a broader scope of the present disclosure.

Although example embodiments are described herein, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A luminaire comprising:
   a lighting assembly comprising:
      a housing assembly that defines an internal cavity and a light emitting opening;
      a lightguide that is disposed in the internal cavity such that the lightguide receives light from a light source in the internal cavity through an edge of the lightguide and emits the light through a major surface thereof and through the light emitting opening; and
      a sealing assembly comprising a lens and a gasket, wherein the lens is coupled to a bottom of the housing assembly such that the lens covers the light emitting opening; and
   a mounting bracket disposed on a top of the lighting assembly, wherein the mounting bracket is configured to mount the lighting assembly to a mounting structure that is disposed in a mounting surface such that the lighting assembly of the luminaire is securely retained between the mounting structure and the mounting bracket, wherein a seal is created and maintained by the gasket of the sealing assembly between the lighting assembly and the mounting structure, and
   wherein the mounting bracket is adjustable to mount the lighting assembly and maintain the seal created by the gasket of the sealing assembly between the lighting assembly and the mounting structure.

2. The luminaire of claim 1, wherein the mounting bracket comprises an adjustment aperture that is configured to receive fasteners therethrough to couple the lighting assembly to the mounting structure.

3. The luminaire of claim 2, wherein the adjustment aperture is a vertically oriented obround shaped aperture.

4. The luminaire of claim 2, wherein the adjustment aperture comprises a first end and a second end, wherein a fastener is positioned at or between the first end and the second end based on a thickness of the sealing assembly to establish and maintain the seal by compressing the lighting assembly and the mounting structure against the gasket.

5. The luminaire of claim 1, wherein the lens covers the light emitting opening and a portion of the housing assembly, the portion of the housing assembly being adjacent to a perimeter of the light emitting opening, and wherein the gasket is disposed on the lens adjacent to a perimeter thereof.

6. The luminaire of claim 5, wherein the lens is coupled to the portion of the housing assembly using an adhesive tape such that the adhesive tape is disposed between the portion of the housing assembly and the lens.

7. The luminaire of claim 1, wherein the first thickness is 0.03 inch and the second thickness is 1.5 inch.

8. The luminaire of claim 1, wherein the housing assembly comprises an outer surface that faces an area that is to be illuminated by the luminaire.

9. The luminaire of claim 1, wherein the luminaire is a recessed luminaire.

10. The luminaire of claim 1, wherein the mounting surface is a ceiling surface and the mounting structure is a T-grid.

11. The luminaire of claim 1, wherein the mounting surface is a ceiling surface and the mounting structure is a drywall frame.

12. A lighting system comprising:
   a sealed luminaire comprising:
      a light engine that comprises a lightguide and a light source that operate in concert to emit light through a light emitting opening of the light engine; and
      a sealing assembly comprising:
         a protective lens coupled to a bottom of the light engine and covering the light emitting opening; and.
         a gasket coupled to a bottom of the protective lens and disposed adjacent to a perimeter thereof to create a seal between the sealed luminaire and a mounting structure; and
   a mounting bracket that is configured to securely retain the sealed luminaire between the mounting structure and the mounting bracket, and
   wherein the mounting bracket is adjustable to mount the sealed luminaire against the mounting structure, thereby compressing the protective lens and the mounting structure against the gasket of the sealing assembly to create and maintain the seal therebetween.

13. The lighting system of claim 12, wherein the mounting bracket comprises an adjustment aperture that is configured to receive fasteners therethrough to couple the sealed luminaire to the mounting structure such that the sealed luminaire is clamped between the mounting bracket and the mounting structure.

14. The lighting system of claim 13, wherein the adjustment aperture is a vertically oriented obround shaped aperture.

15. The lighting system of claim 13, wherein the adjustment aperture comprises a first end and a second end, wherein a fastener is positioned at or between the first end and the second end based on a thickness of the sealed luminaire to establish and maintain the seal by compressing the protective lens and the mounting structure against the gasket.

16. The lighting system of claim 12, wherein the protective lens is coupled to the light engine using a double sided adhesive tape.

17. The lighting system of claim 12, wherein the mounting structure is a T-grid.

18. The lighting system of claim 12, wherein the mounting structure is a drywall frame.

19. The lighting system of claim 12, wherein the light engine comprises:
   a housing assembly that defines an internal cavity, wherein the lightguide and the light source are disposed in the internal cavity of the housing assembly such that the light from the light source enters the lightguide through an edge thereof and exits the lightguide through a major surface thereof.

20. The lighting system of claim 12, wherein the sealed luminaire is a recessed luminaire.

* * * * *